April 18, 1950     C. P. STANLEY     2,504,464
METHOD FOR CONTROL OF DISTILLATION COLUMNS
Filed Feb. 4, 1946
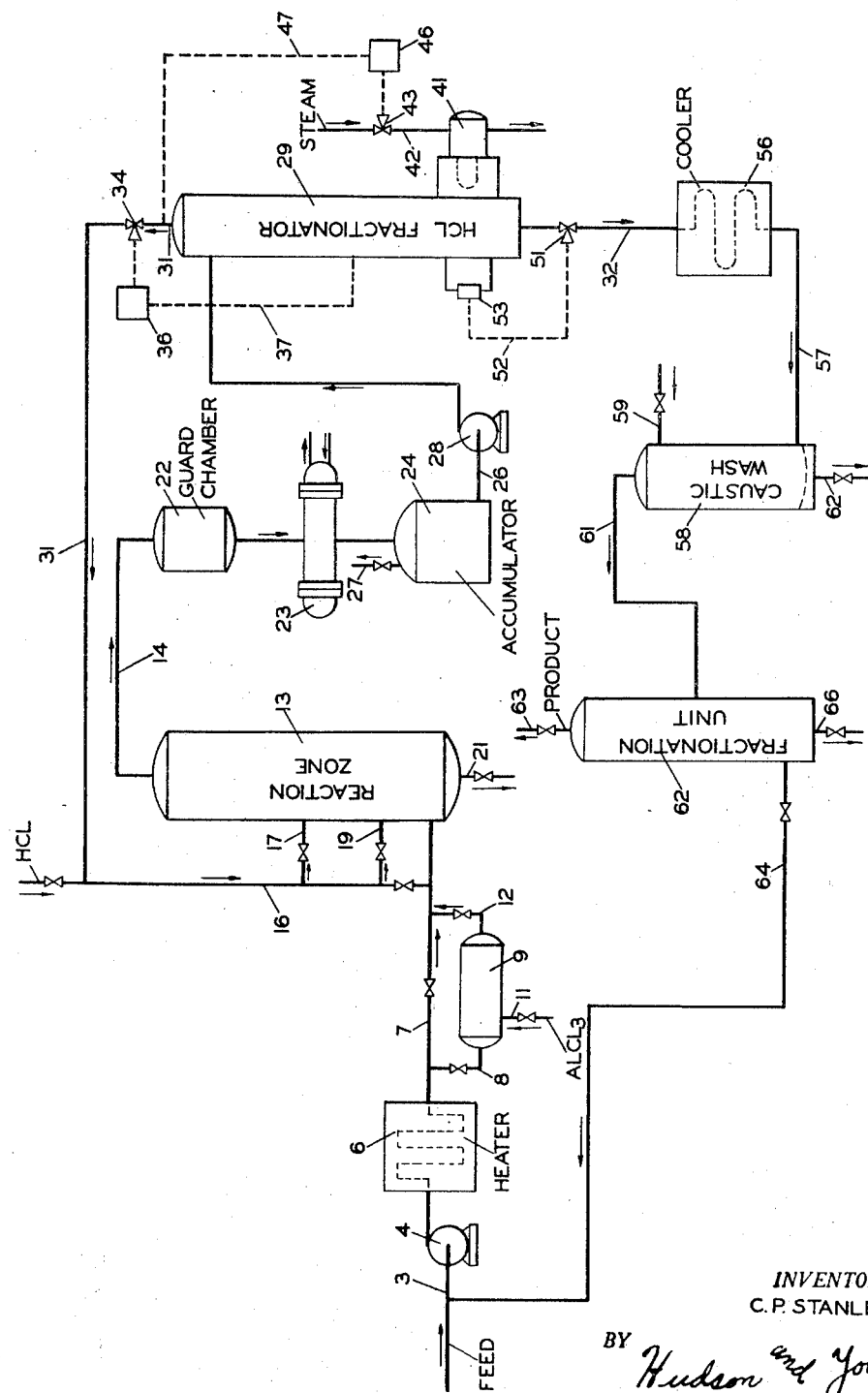
INVENTOR.
C. P. STANLEY
BY Hudson and Young
ATTORNEYS Patented Apr. 18, 1950

2,504,464

UNITED STATES PATENT OFFICE 2,504,464

METHOD FOR CONTROL OF DISTILLATION COLUMNS

Clyde P. Stanley, Phillips, Tex., assignor to Phillips Petroleum Company, a corporation of Delaware Application February 4, 1946, Serial No. 645,470

6 Claims. (Cl. 202—40)

This invention relates to a method for separation of components of a fluid mixture. One aspect of this invention relates to an improved method for the distillation of a liquid mixture. Another aspect of this invention relates to an improved method for the operation of stripping and distillation columns. Still another aspect of this invention relates to the stripping of hydrogen chloride from the conversion effluent of an isomerization process promoted with hydrogen chloride.

Various difficulties and problems are encountered in the distillation and stripping of various components from a liquid mixture, especially in stripping hydrogen chloride from the conversion effluent of an isomerization process. In isomerization processes, such as the isomerization of normal butane to isobutane in the presence of aluminum chloride as a catalyst and hydrogen chloride as a promoter, the conversion effluent from the isomerization process contains a considerable amount of dissolved hydrogen chloride. It is desirable to remove the hydrogen chloride from the hydrocarbon effluent in order to recycle the recovered hydrogen chloride to the isomerization reaction as a promoter and in order to prevent corrosion of subsequent equipment in the isomerization process. For these reasons the hydrocarbon conversion effluent from the isomerization reaction zone is passed to a distillation or stripping zone in which the dissolved hydrogen chloride is removed as an overhead fraction, and hydrocarbons comprising butanes and heavier hydrocarbons are removed from the fractionating or stripping column as a bottom product. An overhead fraction containing the hydrogen chloride from the stripping zone is recycled to the isomerization reaction zone. With the use of conventional type controls for operation of the distillation or stripping zone, it is difficult to maintain a satisfactory operation of the column because of frequent upsets resulting from changes in the column feed rate, and hydrogen chloride and/or isobutane content of the feed stream. Such fluctuations cause the hydrogen chloride distillation or stripping column to "puke" and permit some hydrogen chloride to be lost with the kettle product. Numerous control systems have been used to control distillation and stripping columns, such as controlling the rate of steam input to the column reboiler by a temperature recorder-controller responsive to the temperature at a given point in the column and by controlling the column pressure by a conventional pressure controller-recorder actuating a diaphragm motor valve in the overhead vapor conduit. Other variations of controls include complete hand control, constant steam input, constant overhead withdrawal, etc. Operation of distillation and stripping columns with the conventional type of controls have proved to be inadequate because broad fluctuations in temperature and pressure are inevitable. In the case of hydrogen chloride stripping, the result of inadequate control is incomplete stripping of the hydrogen chloride from the hydrocarbon effluent stream. It is much to be desired, therefore, to provide a method for control of distillation and stripping columns whereby close control of both temperature and pressure can be achieved during the distillation or stripping operation regardless of the variations in feed input and composition.

It is an object of this invention to provide a method for accurate control of distillation and stripping columns.

It is another object of this invention to provide a method for stripping hydrogen chloride from a hydrocarbon isomerization effluent.

It is still another object of this invention to provide a method for maintaining a relatively constant overhead rate in a stripping column.

Another object of this invention is to maintain substantially constant conditions of temperature and pressure of a distillation column.

A further object of this invention is to maintain constant conversion in an isomerization process.

It is still a further object to eliminate entrainment or "slugging" of liquids with the overhead vapor from distillation or stripping columns.

It is yet another object of this invention to operate a fractionating or stripping column at its maximum capacity and still achieve the above objects.

A further object is to improve the operation of an isomerization process.

In the operation of a distillation or stripping column including an overhead flow conduit and a reboiler in the lower portion of the column, this invention comprises passing a fluid mixture into a distillation zone under conditions suitable for removing an overhead fraction comprising the lighter components of the feed mixture and a bottom fraction comprising the heavier components of the feed mixture, controlling the rate of flow of the overhead fraction from the distillation zone by a suitable control means responsive to a predetermined temperature in the distillation zone, which control means actuates a flow control valve on the overhead flow conduit from the distillation zone, and controlling the pressure in the distillation zone by a control means responsive to a predetermined pressure in the distillation zone, which control means actuates a flow control valve on a heating medium input conduit of the reboiler.

Since the temperature at any point in the distillation zone is substantially a function of the pressure and composition at that point, i. e., in the case of hydrogen chloride strippers the hydrogen chloride content, the temperature is controlled by passing enough overhead vapors off the top of the stripping or distillation zone to maintain the desired composition of light components at some predetermined intermediate point in the column. This function is accomplished by placing a thermocouple, mercury bulb or other temperature responsive device at some predetermined point in the distillation column. This temperature responsive device transmits a continuous impulse to a secondary recorder or controller which is adjusted to send a pneumatic or electrical impulse to the flow control valve in the overhead conduit of the distillation column. Control of this valve in the overhead line distillation column allows sufficient vapors to be discharged from the upper portion of the distillation zone to maintain a predetermined temperature at the point in which the thermocouple or other means is positioned. The pressure of the distillation column is controlled by a pressure transmission system from a point on the overhead flow conduit or at the top of the distillation column itself which adjusts the flow of steam or other heating medium to the reboiler or heating means at the bottom of the column. The variation in heat input in the lower portion of the column controlled by the pressure in the upper portion of the distillation zone maintains the distillation pressure at a predetermined amount.

In its simplest terms this invention is a method and apparatus for controlling the temperature and pressure of a distillation zone which comprises maintaining the temperature at a predetermined point in the zone by regulating the flow of overhead vapors from the distillation zone and maintaining the pressure in the distillation zone by regulating the heat input to liquid in the lower portion of the distillation zone.

This control mechanism is applicable to both fractional distillation columns and stripping columns. However, the control mechanism is preferably applied to the operation of a stripping column because most stripping operations are concerned primarily with the removal of some one component from the bottom fraction and is not concerned with the exact composition of the overhead fraction.

The drawing illustrates diagrammatically one application of this invention to the isomerization of hydrocarbons. Where it is desired to produce isobutane by the isomerization of a normal butane, a suitable isomerization feed containing normal butane is conveyed through line 3 via pump 4 to a heater 6 to be vaporized. After heater 6 the vaporized feed stream is divided into two streams; one stream is passed through line 7 directly to a reaction zone 13, while the other stream enters a catalyst make-up tank 9 through line 8, in which tank a metal halide catalyst contained therein is sublimed. This sublimed catalyst and vaporized feed pass through line 12 and line 7 into reaction zone 13. In heater 6 the feed is vaporized at a temperature between about 225 and about 325° F. The metal halide catalyst, such as aluminum chloride, is added to make-up tank 9 through line 11, when necessary.

Hydrogen chloride, which has a beneficial effect on the life and activity of the cataylst when present in the concentration of about 2 to about 5.0 mol per cent of incoming feed, enters reaction zone 13 through line 16, 17 and 19. A pressure of about 200 to about 300 pounds per square inch gage is maintained in reaction chamber 13. Although conversion is not very sensitive to velocity within the chamber, a space velocity less than one liquid volume of feed per volume of catalyst per hour is most desirable. The reaction chamber 13 is packed with an adsorptive catalyst such as "Porocel" (2 to 20 mesh) impregnated with a Friedel-Crafts metal halide. The vaporous effluent from reaction zone 13 passes through line 14 to a guard chamber 22 which chamber is packed with a suitable adsorptive material, such as bauxite, to remove sublimed metal halide. From guard chamber 22 the hydrocarbon effluent passes through a condenser 23 to accumulator 24. Light gases may be vented from the isomerization system through line 27, if desired, in order to keep down the pressure in the system.

A liquefied hydrocarbon mixture containing dissolved hydrogen chloride is passed from accumulator 24 through line 26 to a hydrogen chloride fractionator 29 by means of pump 28. Fractionator 29 preferably operates as a stripping column for removal of hydrogen chloride and some low-boiling hydrocarbons, such as butanes, as an overhead fraction from the liquefied hydrocarbon mixture. In the preferred embodiment of this invention, the liquefied hydrocarbon effluent from accumulator 24 is passed into the upper portion of hydrogen chloride fractionator 29. An overhead fraction is removed from fractionator 29 through line 31 and is recycled to reaction zone 13 through line 16. Make-up hydrogen chloride may be added to the isomerization system through line 16. A bottom fraction comprising butanes and heavier hydrocarbons are removed from the hydrogen chloride fractionator 29 through line 32 and passed through a cooler 56 and line 57 to a caustic wash tower 58.

For maximum efficiency hydrogen chloride fractionator 29 is operated at an overhead temperature between about 125 and about 175° F., a kettle temperature between about 200 and about 300° F. and at a pressure between about 300 and about 350 pounds per square inch gage. An automatic flow control valve 34 on overhead line 31 is actuated by a conventional recorder-controller 36, electronically or pneumatically operated. Recorder-controller 36 through a transmission means 37 is responsive to temperature at a certain point, usually the middle tray, in distillation column 29. An appropriate temperature is determined for this point for proper operation of the distillation column. The temperature of the control point determines the operation of valve 34 by means of recorder-controller 36 in a manner such that the rate of flow of the overhead vapors is changed inversely to changes in temperature of the control point in an amount sufficient to maintain a desired temperature in column 29. The pressure of the distillation column operates a recorder-controller 46 which actuates an automatic flow control valve 43 on the steam input line 42 to a reboiler 41. Recorder-controller 46 is responsive to the pressure in the upper portion of distillation column 29 through a conventional transmission means 47 connected to line 31 below valve 34. Transmission means 37 and 47 may be electrically, pneumatically or mechanically operated. The pressure of distillation column 29 operates valve 43 by means of recorder-controller 46 in a manner such that heat input to reboiler 41 is changed inversely to changes in pressure in column 29 in an amount sufficient to maintain a desired pressure in column 29.

Preferably, a constant liquid level is maintained in distillation zone 29 by the operation of a conventional liquid level indicator 53 on an automatic flow control valve 51 in line 32 through a transmission means 52.

A suitable caustic solution, such as a sodium hydroxide solution, is introduced into caustic wash tower 58 through line 59 and is removed therefrom through line 62. Traces of aluminum chloride and hydrogen chloride entrained or dissolved in the liquid hydrocarbon effluent are neutralized in caustic wash tower 58. The liquid hydrocarbon effluent is passed from caustic wash tower 58 to a fractional distillation unit 62 by means of line 61. Fractionation unit 62 may represent a series of fractional distillation columns or a single distillation column as is necessary to achieve the desired separation of the components of the effluent. Isobutane as a product of the process is recovered from distillation unit 62 through line 63. Products heavier than butanes are recovered from distillation unit 62 through line 66. Normal butane is recovered from distillation unit 62 through line 64 and is recycled to feed line 3.

The catalyst carrier used in the execution of this invention comprises a solid sorptive inorganic material which has been partially dehydrated by heating it to a temperature greater than 400° F. but not sufficiently high to drive off all of the water contained therein, or to effect an adverse change in the crystal structure. An essential constituent of the catalyst mass is a solid sorptive inorganic material. Since the catalyst is subjected to a dehydration treatment prior to its use, it will not suffer any further substantial dehydration and retains its character as a partially but not completely dehydrated solid inorganic sorptive material when used in the isomerization process.

Among the solid inorganic compounds suitable in this process by virtue of the fact that they are good sorptive materials are the mineral or mineral like compounds, preferably nearly completely dehydrated, such as the kaolinites, alumina clays, fuller's earth, pyrophillite, apophylite, meerschaum, serpentine, kieserite, bentonite, talc, bauxite, the permutites, the zeolites and the like, as well as the prepared hydrated materials such as the prepared permutites and zeolites, aluminum oxides, magnesium oxides, silica, and similar compounds prepared by partial dehydration of the hydroxides and the like.

The sorptive materials listed above are employed in admixture or in combination with an active metal halide isomerization catalyst of the Friedel-Crafts or aluminum halide type. Preferred catalysts are those comprising aluminum chloride and aluminum bromide.

This supported aluminum halide catalyst may be used mixed with or supported on other materials which may or may not have a catalytic effect on the isomerization reaction. Suitable inert materials with which the catalyst can be mixed or supported upon are chamotte, quartz, intensively calcined clays, and completely dehydrated alumina.

The catalytic material in any suitable solid form as powder, pillules, pellets, or granules of the desired size is employed in manners customary in the execution of catalytic processes of this type. The desired quantity of the granular catalyst material may be packed or otherwise contained in a reaction tube, chamber or tower and maintained at the desired temperature by suitable heating and/or cooling means while the material to be treated is passed into contact with it under the appropriate pressure for the required period of time.

The isomerization reaction is executed at a temperature not greater than about 400° F. and preferably at temperatures below 325° F. At temperatures above 400° F. losses of material due to undesirable cracking reactions are prohibitive. The lower limit of temperature range is set by that temperature at which the desired isomerization will take place at a practical rate. Temperatures as low as about 125° F. may be used in some cases. A preferred practical operating range is from about 150° F. to about 325° F.

Unless fairly high pressures are used, the catalyst may suffer loss of activity because of the sublimation of the metal halide therefrom or because of further dehydration of the partially dehydrated catalyst mass. Thus, it is preferred to use pressures from 200 to 400 pounds per square inch gage. In practice the temperature and pressure are adjusted so that the isomerization reaction is carried out in the vapor phase. It may also be carried out in the liquid phase if desired. By operation at superatmospheric pressures, excellent conversion can be obtained at temperatures so low that side reactions and sublimation of the metal halide from the catalyst mass are substantially eliminated.

The presence in the reaction system of a hydrogen halide or substance capable of yielding a hydrogen halide under the conditions existing in the reaction system appears to have a beneficial effect upon the life and activity of the metal halide-containing catalyst, particularly those containing an aluminum halide. In many cases it is beneficial to the reaction to have relatively small amounts of hydrogen chloride added to the reactants and present during the reaction. As a substance capable of yielding a hydrogen halide, tertiary butyl chloride and the like halides which will decompose under reaction conditions to yield the hydrogen halide, may be added to the system. The amount of hydrogen halide within the reaction zone at any time should not be more than 10 mol per cent for best results.

The most suitable contact time will depend upon the particular catalyst, upon the reaction conditions, and upon the feed used. The contact time is chosen so that a practicable conversion is obtained with the minimum side reactions. In isomerization of normal butane in the vapor phase at temperatures between 150° F. and 325° F., contact times from about 20 to about 200 seconds are used, for liquid phase somewhat lower temperatures and higher pressures are used.

The isomerization catalyst, after it has suffered substantial deactivation because of use in the process, can be restored to its initial activity by addition, at a temperature not greater than about 400° F., of an aluminum halide. The reactivation can be effected without removing the catalyst from the reaction chamber, while the catalyst is functioning, but preferably after the catalyst has temporarily been taken out of use.

Examples

I

According to standard distillation practice the conventional control system for a hydrogen chloride stripping unit comprises an instrument or means responsive to temperature at some intermediate point in the stripping column, which instrument regulates or controls the flow of heating medium, such as steam, to the reboiler of the stripping column to maintain a desired temperature. The pressure of the stripping column is controlled by an instrument or means responsive to pressure at a point near the top of the column or in the overhead vapor line, which instrument actuates a conventional motor or diaphragm valve in the overhead vapor line of the column. In an actual operation of such a stripping column using conventional controls, the column pressure varied from ±15 pounds per square inch. The temperature which was controlled on the middle tray varied ±20° F. The steam input to the reboiler of the stripping column varied over 100 per cent. The net result of such variation of control was that the capacity of the stripping or distillation column was reduced from about 15 to about 20 per cent below that which is realizable by operations according to this invention. The composition and quantity of the overhead vapor stream from the column varied widely and resulted in an equivalent variation in the conversion of the isomerization reaction zone to which the overhead was recycled. Occasionally, the stripping column operated in the above manner carried substantial quantities of liquid in the overhead stream which entered the reaction zone in the liquid phase and caused substantial damage to the catalyst bed.

II

This invention was placed in operation in an isomerization process for the removal of hydrogen chloride from the isomerization effluent. In the application of this invention a four foot diameter, 30 tray bubble type stripping column of 400 pounds per square inch working pressure was used. A feed to that column having approximately the following composition was introduced at a rate of 350,000 gallons per day.

| Component: | Volume per cent |
|---|---|
| HCl | 6 |
| Propane | 1 |
| Isobutane | 40 |
| Normal butane | 52 |
| Isopentane and heavier | 1 |
| | 100 |

The hydrocarbon feed from the isomerization unit entered the 30th tray of the stripping column at a pressure of about 325 pounds per square inch gage and at a temperature between about 125 and about 135° F. The feed may enter the stripping column on the 28th tray with equally good results. The overhead vapor comprising about 50,000 to 52,000 gallons per day had the following composition:

| Component: | Volume per cent |
|---|---|
| HCl | 40 |
| Propane | 5 |
| Isobutane | 30 |
| Normal butane | 25 |
| | 100 |

The column was operated at a kettle temperature of 245° F., a 12th tray temperature of 240° F., a 16th tray temperature, which was the control temperature, of about 210° F., and an overhead temperature of 165° F.

With the control of the stripping column operated in accordance with this invention, the stripping column pressure varied ±1.5 pounds per square inch and the temperature on the 16th tray varied a ±6° F. (from about 205 to about 217° F.).

As a partial explanation of the operation of the stripping column according to this invention, of the 350,000 gallons per day of feed, approximately 300,000 gallons were heated from about 130° F. to about 245° F. and were withdrawn as a kettle product. Approximately 50,000 gallons were heated from 130° F. to 165° F. and vaporized. The vaporized portion was withdrawn as overhead fraction. A heat balance indicated that approximately 177,000,000 B. t. u.'s per day are consumed in heating the kettle product. The same heat balance indicated that about 19,000,000 B. t. u.'s per day are consumed in heating and vaporizing the overhead fraction. From these figures it is evident that the overhead vapor rate may change by as much as 50 per cent and yet the heat input rate through the reboiler as a result of the change in the overhead vapor rate will be varied only about 10 per cent. This small change of heat input to the kettle compared to the 100 per cent heat input variation experienced with the conventional control system causes no upset in the operation of the stripping column. With the conventionally operated system a change in the feed composition, feed rate, or feed temperature must effect a change in the temperature responsive instrument and when the 16th tray was the temperature control point the change would naturally progress downward to this point resulting in some hydrogen chloride being withdrawn in the kettle product. The temperature responsive instrument of the conventional set up continued to add steam to the reboiler until the desired temperature was again obtained on the 16th tray (the control point). A continued addition of steam to the reboiler resulted in excessive surging and cycling in the stripping column.

Although the application of this invention has been described with regard to a process for isomerization of hydrocarbons, this invention applies to the operation, generally, of distillation columns regardless of the process in which the distillation columns are used. Various items of equipment and flow conduits such as heaters, accumulators, condensers, pumps, etc., have been omitted from the diagram, which may be supplied by one skilled in the art without departing from the scope of this invention.

Having described my invention, I claim:

1. In a process wherein there is being stripped from a hydrocarbon containing the same a non-hydrocarbon material which is considerably more volatile than said hydrocarbon, under the conditions of stripping, so that variations of said volatile material in the feed to the stripping operation can cause said operation to function irregularly the steps, in combination, which comprise introducing a mixture of hydrocarbon and said volatile material into the upper portion of a stripping zone, maintaining said zone under conditions of temperature and pressure such as to vaporize said volatile material and maintain a substantial portion of said hydrocarbon in liquid phase, heating liquid in the lower portion of said zone by indirect heat exchange, removing liquid hydrocarbon as a bottom product from said zone, and removing a vaporous overhead fraction comprising said volatile material, the method of simultaneously controlling said temperature and pressure which comprises changing the rate of removal of said overhead fraction inversely to variations in temperature from a predetermined temperature at a given point in said zone and automatically regulating the heat input to said liquid in response to variations in pressure in said zone.

2. In a process for stripping HCl from a mixture of the same with a hydrocarbon which comprises introducing a mixture of HCl and hydrocarbon into the upper portion of a stripping zone, maintaining said stripping zone under conditions of temperature and pressure such as to vaporize HCl and maintain a substantial portion of said hydrocarbon in liquid phase, maintaining a liquid level in the lower portion of said zone, heating said liquid, removing liquid hydrocarbon from the lower portion of said zone, and removing a vaporous overhead fraction comprising HCl, the method of controlling the temperature and pressure in said zone comprising changing the rate of removal of said overhead fraction inversely to variations in temperature from a predetermined temperature at a fixed point in said zone, and simultaneously changing the heat input into said liquid inversely to variations in pressure from a predetermined pressure.

3. In a process for stripping HCl from a mixture of the same with a hydrocarbon which comprises passing a liquid mixture of HCl and hydrocarbon into the upper portion of a stripping zone, maintaining a liquid level in the lower portion of said zone and heating said liquid, removing liquid hydrocarbon from the lower portion of said zone, and removing a vaporous overhead fraction comprising HCl from the upper portion of said zone, the method of maintaining substantially constant temperature at a selected point in said zone and a substantially constant pressure therein comprising automatically regulating the rate of removal of said overhead fraction so as to substantially maintain said constant temperature and automatically regulating the heat input to the liquid in said lower portion of said zone so as to substantially maintain said constant pressure.

4. The process of claim 3 in which the temperature of the overhead fraction is maintained in the range of about 125° and about 175° F. and the pressure is maintained in the range of about 300 and about 350 p. s. i. g.

5. The process of claim 4 in which the HCl-hydrocarbon mixture is a hydrocarbon conversion effluent from an isomerization reaction.

6. The process of claim 3 in which the HCl-hydrocarbon mixture is a hydrocarbon conversion effluent from an isomerization reaction.

CLYDE P. STANLEY.

REFERENCES CITED

The following references are of record in the file of this patent:

UNITED STATES PATENTS

| Number | Name | Date |
| --- | --- | --- |
| 79,260 | Savalle | June 23, 1868 |
| 1,828,691 | Stransky | Oct. 20, 1931 |
| 2,236,035 | Luhrs | Nov. 25, 1941 |
| 2,277,070 | Carney | Mar. 24, 1942 |
| 2,281,282 | Gerhold | Apr. 28, 1942 |
| 2,297,098 | Carney | Sept. 29, 1942 |
| 2,364,341 | Bright et al. | Dec. 5, 1944 |
| 2,396,723 | Scoville et al. | Mar. 19, 1946 |
| 2,404,499 | Iverson | July 23, 1946 |
| 2,414,371 | Fragen et al. | Jan. 14, 1947 |

OTHER REFERENCES

Robinson and Gilliland, "Elements of Fractional Distillation," published 1939 by McGraw-Hill Book Company, Inc., New York, New York. (Copy in Division 25, page 249.)